United States Patent [19]

Borrelli et al.

[11] Patent Number: 5,019,538

[45] Date of Patent: May 28, 1991

[54] COLORED PHOTOSENSITIVE OPAL GLASSES

[75] Inventors: Nicholas F. Borrelli, Elmira; Dennis W. Smith, Corning, both of N.Y.

[73] Assignee: Coring Incorporated, Corning, N.Y.

[21] Appl. No.: 434,222

[22] Filed: Nov. 13, 1989

[51] Int. Cl.$^5$ ............................ C03C 4/04; C03C 14/00
[52] U.S. Cl. ............................................. 501/13; 501/32
[58] Field of Search ................................... 501/13, 32

[56] References Cited

U.S. PATENT DOCUMENTS

| | | | |
|---|---|---|---|
| 2,651,145 | 9/1953 | Stookey | 501/56 |
| 2,684,911 | 7/1954 | Stookey | 501/13 |
| 4,017,318 | 4/1977 | Pierson et al. | 501/13 |
| 4,092,139 | 5/1978 | Ference | 501/13 |
| 4,118,214 | 10/1978 | Wedding | 501/13 |
| 4,130,680 | 12/1978 | Ference et al. | 501/13 |

Primary Examiner—Mark L. Bell
Attorney, Agent, or Firm—C. S. Janes, Jr.

[57] ABSTRACT

This invention is directed to photosensitively opacifiable glasses consisting essentially, in weight percent, of about 14–18% $Na_2O$, 0–6% ZnO, 6–12% $Al_2O_3$, 0–5% $B_2O_3$, 0–0.2% $Sb_2O_3$, 0–0.1% SnO, 65–72% $SiO_2$, and 0.007–0.04% Ag, 0.008–0.05% $CeO_2$, 0.7–1.25% Br, and 1.5–2.5% F as analyzed in the glass, the sum of those components constituting at least 90% of the total composition, which, through an exposure to ultraviolet radiation, followed by a three-step heat treatment, and then a re-exposure to ultraviolet radiation at an elevated temperature, can be converted into a colored opal glass.

2 Claims, No Drawings

COLORED PHOTOSENSITIVE OPAL GLASSES

BACKGROUND OF THE INVENTION

Photosensitively opacifiable glasses, i.e., glasses which can be thermally opacified after being exposed to ultraviolet radiation, has their genesis in U.S. Pat. No. 2,651,145 (Stookey). That patent discloses such glasses (frequently referred to by the shorthand expression photosensitive opal glasses) as consisting essentially, expressed in terms of weight percent on the oxide basis, of 55-75% $SiO_2$, 12-18% $R_2O$, where $R_2O$ consists of 0-2% $Li_2O$, 5-18% $Na_2O$, and 0-13% $K_2O$, 2-12% $Al_2O_3$, 0.005-0.05% $CeO_2$, 0.0001-0.3% Ag, computed as AgCl, and, as analyzed, 1.8-3% fluorine, and the indicated proportion of a halogen selected from the group of 0.01-2% chlorine, 0.02-0.4% bromine, and 0.03-0.6% iodine, the sum of those constituents composing at least 85% of the total composition. As optional ingredients the patent noted that BeO, MgO, and CaO should not be present in amounts greater than 3%, either separately or collectively. Up to 12% BaO, SrO, and ZnO may be included either separately or collectively. Up to 5% CdO may be added. Nevertheless, the total of all of the aboveidentified divalent metal oxides ought not to exceed 12%.

The patent cautioned against the inclusion of materials strongly absorbing in the ultraviolet region of the radiation spectrum, with specific reference being made to glass colorants such as selenium and its compounds, to oxides of iron, copper, uranium, and vanadium, and to non-coloring oxides of arsenic, lead, and thallium.

The patent further noted the advantageous presence of up to 0.2% $Sb_2O_3$ or up to 0.1% $SnO_2$ to enhance the photosensitivity of the glass. Greater levels of each should be avoided, however, inasmuch as photosensitivity was sharply reduced thereby. The incorporation of $Sb_2O_3$ was preferred over $SnO_2$ because of its concomitant fining action in the glass.

The following hypothesis was provided to explain the mechanism underlying the development of opacity in the glass. Thus, the glasses as melted from batches, cooled and shaped into articles, were clear and transparent, and will remain as such when simply reheated. Subjection to ultraviolet radiations, preferably having wavelengths between 3000–3500 Å, produces an invisible latent image therein. Hence, exposure to ultraviolet radiation causes the photolytic reduction of $Ag^+$ positive ions to silver metal $(Ag°)$, as illustrated in the reaction below $$Ce^{+3} + Ag^+ \xrightarrow{h\nu} Ce^{4+} + Ag°$$

wherein hv represents a photon of electromagnetic radiation. That latent image, present only in the radiation-exposed portion of the glass, is converted to a visible opaque image via a subsequent three-stage heat/cool treatment.

In the first stage the exposed glass body was heated for a time and at a temperature ranging from about one minute at about 50° C. above the softening point of the glass to about one hour at about 150° C. below the softening point of the glass. Temperatures lower than about 150° C. below the softening point were stated to be ineffective, while temperatures more than about 50° C. above the softening point were deemed to be both impractical and detrimental to the image. It was theorized that the above-described initial heat treatment caused the generation of submicroscopic nuclei of colloidal silver which did not result in any visible change in appearance of the glass. (It was noted, however, that where the level of silver exceeded about 0.002%, the silver nuclei developed were of such size and number to impart a yellow coloration to the glass.)

In the second stage the glass body was cooled to a temperature at least below 500° C. Again, no visible change was observed in the glass but it was conjectured that submicroscopic nuclei of the opacifying agent, viz., an alkali metal fluoride, are formed on the colloidal silver nuclei as a result of the cooling. The degree of cooling below 500° C. was not considered to be critical, but the cooling below 500° C. was emphasized as being vital to obtain the degree of opacity desired.

In the third stage the glass article was reheated to a temperature not lower than about 100° C. below the softening point of the glass for a period of time sufficient to effect the growth of the alkali metal fluoride nuclei to form opacifying crystallites. These opacifying crystallites grow only in those portions of the glass body previously subjected to ultraviolet radiation.

Photosensitive opal glasses produced according to the method, and with the glass compositions outlined in U.S. Pat. No. 2,651,145 containing NaF crystallites to impart opacity thereto, have been marketed commercially by Corning Incorporated, Corning, N.Y. for in excess of 30 years under the trademark FOTALITE ®. One such glass which has been utilized in the fabrication of flat panels for architectural applications as Corning Code 8607 consists of the following approximate composition, analyzed in weight percent:

| $SiO_2$ | 70.4 | F | 2.5 | Ag | 0.0008 |
|---|---|---|---|---|---|
| $Na_2O$ | 16.36 | $Sb_2O_3$ | 0.2 | *$Co_3O_4$ | 0.005 |
| ZnO | 5.0 | Br | 0.5 | *NiO | 0.05 |
| $Al_2O_3$ | 8.0 | $CeO_2$ | 0.015 | SnO | 0.01 |

*Colorants to impart a light gray tint

The heat treatment applied to the glass subsequent to the exposure to ultraviolet radiation in the commercial manufacture of photosensitive opal glass articles has comprised a three-stage schedule involving heating to about 540° C. and maintaining that temperature for about one hour, cooling the article to below about 360° C., reheating to about 580° C. and holding thereat for about one hour, and thereafter cooling to room temperature.

U.S. Pat. No. 2,651,145 also observed that different colors could be produced in those opal glasses through the use of radiation exposures of different intensities or for different times and/or varying the temperature and/or time of the two heat treating steps. Nevertheless, because control of the colors produced was so difficult, no commercial use resulted therefrom.

More recent research to devise colored transparent and opal photosensitive glasses, wherein the identity of the colors can be more readily controlled, led to U.S. Pat. No. 4,017,318 (Pierson et al.). That patent describes a sequence of irradiations and heat treatments applied to glasses preferably consisting essentially, in weight percent, of 10-20% $Na_2O$, 0.0005-0.3% Ag, 1-4% F, 0.01-0.2% $CeO_2$, an amount of at least one halide selected from the group of Cl, Br, and I sufficient to react stoichiometrically with the Ag, but not more than a total of 3%, and the remainder $SiO_2$. The inventive method comprised five basic steps:

(1) a glass body was exposed to high energy or actinic radiation, desirably ultraviolet radiations;

(2) the body so exposed was heated to a temperature between the transformation range and the softening point of the glass for a sufficient length of time to effect nucleation and growth of microcrystals of sodium fluoride containing at least one silver halide selected from the group of AgCl, AgBr, and AgI;

(3) re-exposing said body to said high energy or actinic radiation;

(4) re-heating said body to a temperature between the transformation range and the softening point of the glass for a sufficient length of time to cause metallic silver to be deposited as discrete colloidal particles less than 200 Å in the smallest dimension, and/or deposited within said microcrystals, the silver-containing part of said microcrystals being less than 200 Å in the smallest dimension, and/or deposited on the surface of said microcrystals, the portion of the microcrystal coated with silver being less than 200 Å in the smallest dimension, said microcrystals having a concentration of at least 0.005% by volume; and thereafter (5) cooling said body to room temperature.

The microcrystals produced exhibited an acicular morphology. Thus, the crystals commonly appear as elongated pyramids with length-to-width ratios greater than two with metallic silver being concentrated in or on the tip of the crystal. The coloring displayed by the glasses, termed polychromatic glasses, has been attributed to optical absorption associated with this deposition of silver photoreduced through the second exposure to radiation and heat treatment.

A modification of the above method for preparing polychromatic glasses is disclosed in U.S. Pat. No. 4,092,139 (Ference). As described therein, the initial irradiation and heat treatment steps tracked those disclosed in U.S. Pat. No. 4,017,318. However, the glass body was thereafter re-exposed, while at a temperature between about 200°–410° C., for a sufficient length of time to effect the necessary deposition of metallic silver as discrete colloidal silver particles, and/or deposited on the surface of the NaF microcrystals, and/or deposited within the NaF microcrystals. This combination of exposure and heat treatment as a final step produced the same crystal morphology and range of colors, while dramatically reducing the time required therefor.

More recent research has indicated that the acicular morphology of the crystals in polychromatic glasses is a necessary condition for the development of color therein. Nevertheless, we have discovered that crystal morphology is not the sole factor involved. Hence, we have found that the extent of the capability of a glass to exhibit a broad range of colors is dependent upon the redox state of the glass; in general, the more reduced the glass, the greater the propensity of the glass to color. Moreover, the variations and intensities of the colors developed in polychromatic glasses have involved the use of different glass compositions with long exposures and heat treatments.

U.S. application Ser. No. 07/390,064, now U.S. Pat. No. 4,979,975 filed Aug. 7, 1989 under the title FAST RESPONSE PHOTOSENSITIVE OPAL GLASSES in the names of N. F. Borrelli, J. E. Dickinson, Jr., J. E. Pierson, and S. D. Stookey, describes uncolored thermally opacifiable glass compositions requiring much shorter periods of exposure to ultraviolet radiation of a given intensity in order to develop total opacification, thereby rendering them eminently suitable for glass panels in architectural applications. Those glass compositions were most preferably essentially free from materials strongly absorbing of ultraviolet radiation, explicitly illustrating the deleterious effects resulting from the presence of $Fe_2O_3$ and $TiO_2$, and consisted essentially, in weight percent, of 14–18% $Na_2O$, 0–6% ZnO, 6–12% $Al_2O_3$, 0–5% $B_2O_3$, 0–0.2% $Sb_2O_3$, 65–72% $SiO_2$, and 0.007–0.04% Ag, 0.008–0.05% $CeO_2$, 0.7–1.25% Br, and 1.5–2.5% F as analyzed in the glass, the sum of those components constituting at least 90% of the total composition. The following extraneous optional components are mentioned: up to 2% $Li_2O$, up to 5% $K_2O$, up to 0.1% SnO, up to 3% BeO and/or MgO and/or CaO, up to 5% BaO and/or CdO and/or SrO, up to 0.1% Cl, and up to 0.2% I.

The method for developing opacification in those glasses comprised five general steps:

(a) the glass body was exposed to ultraviolet radiations having wavelengths between about 3000–3500 Å;

(b) the so-exposed glass body was heated to a temperature between about 150° C. below the softening point of the glass to about 50° C. above the softening point thereof for a sufficient length of time to develop nuclei of colloidal silver therein;

(c) the glass body was cooled to a temperature below about 500° C. to cause the development of NaF nuclei on the colloidal silver;

(d) the glass body was reheated to a temperature no lower than about 100° C. below the softening point of the glass for a sufficient length of time to cause the growth of opacifying NaF crystallites on the nuclei; and then (e) the glass body was cooled to room temperature.

It was found that the rate at which opacification penetrated into a glass body could be further improved when the exposure to ultraviolet radiation was carried out when the glass was at a temperature between about 300°–450° C., preferably 300°–400° C.

The sum of that disclosure is incorporated by reference into the present application.

Because of the significant increase in the rate at which opacification penetrates into glass bodies of the above compositions, our research was directed to means for developing colors therein. Thus, the primary objective of our invention was to develop colored photosensitive opal glasses which could exhibit a wide palette of colors for use, for example, in architectural panels from glasses within that range of compositions, the identities and intensities of the colors being readily controlled. A most desirable objective was to develop opal glasses which would exhibit a wide palette of colors which could be obtained by treating a single composition.

SUMMARY OF THE INVENTION

We have found that those objectives can be achieved by subjecting the uncolored, photosensitive opal glasses described above to an exposure of ultraviolet radiation while the glass is at a temperature between about 300°–450° C., preferably between 300°–400° C. Hence, our inventive method for making a glass article having at least a region thereof exhibiting colored opacity comprises the following eight steps:

(1) melting a batch for a glass consisting essentially, expressed in terms of weight percent on the oxide basis, of about 14–18% $Na_2O$, 0–6% ZnO, 6–12%

$Al_2O_3$, 0–5% $B_2O_3$, 0–0.2% $Sb_2O_3$, 0–0.1% SnO, 65–72% $SiO_2$, and 0.007–0.04% Ag, 0.008–0.05% $CeO_2$, 0.7–1.25% Br, and 1.5–2.5% F as analyzed in the glass, the sum of the above components constituting at least 90% of the total composition;

(2) cooling said melt to a temperature at least below the transformation range thereof and simultaneously forming a glass body of a desired configuration therefrom;

(3) exposing at least a region of said glass body to ultraviolet radiation having wavelengths between about 3000–3500 Å for a sufficient length of time to develop a latent image therein;

(4) heating at least said exposed region of said glass body to a temperature between about 150° C. below the softening point of said glass to about 50° C. below the softening point of said glass for a sufficient length of time to develop nuclei of colloidal silver in said glass body;

(5) cooling at least said exposed region of said glass body to a temperature below 500° C. to cause the development of NaF nuclei on said colloidal silver;

(6) reheating at least said exposed region of said glass body to a temperature no higher than about the softening point of said glass for a sufficient length of time to cause the growth of opacifying NaF crystallites on said nuclei;

(7) re-exposing at least said exposed region of said glass body to ultraviolet radiation having wavelengths between about 3000–3500 Å, while at least that portion of said glass body is at a temperature of about 300°–450° C., for a sufficient length of time to cause metallic silver to be deposited onto the surface of at least a portion of at least some of the individual crystallites, that surface portion of said crystallites having said deposit thereon being less than about 200 Å in the smallest dimension; and then (8) cooling said glass body to room temperature.

To assure dense opacity, the concentration of the NaF crystallites will be at least about 0.1% by volume and the size thereof will be at least about 0.1 micron in diameter. Electron microscopy has indicated the crystallites to have a generally acicular morphology.

The preferred compositions will be essentially free from materials strongly absorbing of ultraviolet radiations and may contain as extraneous, optional ingredients up to 2% $Li_2O$, up to 5% $K_2O$, up to 3% BeO and/or MgO and/or CaO, up to 5% BaO and/or CdO and/or SrO, up to 0.1% Cl, and up to 0.2% I. In the preferred practice the re-exposure to ultraviolet radiation will be conducted at about 300°–400° C.

To assure the photoreduction of Ag in the glass, a reducing agent, such as $Sb_2O_3$, SnO, or a carbon-containing material will frequently be included in the batch. Accordingly, the preferred compositions will contain $Sb_2O_3$ and/or SnO. The exact mechanism by which the redox state of the glass effects coloration in the glass is not completely understood, but the photoreduction of Ag at temperatures above 300° C. has been observed to be significantly enhanced via the incorporation of tin or carbon. It is believed that it is this ease of forming silver in the presence of the opal phase which leads to the formation of color.

As was observed in Ser. No. 07/390,064, Hg-Xe arc lamps of 1000 watts power have provided the ultraviolet radiation to which glass panels for architectural applications have been exposed. In like manner to the glasses disclosed there, exposure times of no more than a few minutes, customarily less than one minute, to those lamps will be sufficient to assure essentially total opacification throughout a conventional glass panel fabricated for architectural applications (wall thickness of about 0.25" or 6 mm). Because the color is developed after the glass has been opacified, the depth of penetration of the ultraviolet radiation is understandably limited due to light scattering by the opacifying crystallites. Accordingly, whereas very extended exposures can increase this depth somewhat, for exposures of economic interest, i.e., less than one hour, and more practically less than 0.5 hour, the coloration will be limited to about 1 mm. The colors developed are directly related to the heat treatment schedule utilized in generating the opacifying crystallites. In general, we have found temperatures between about 500°–580° C. are operable, with 500°–560° C. being preferred. At temperatures below 500° C., very long heat treatments are required. At temperatures above about 560° C., there appears to be a diminishing of color.

In summary, this invention comprises a significant improvement upon the invention disclosed in Ser. No. 07/390,064 in that it utilizes the basic method described therein for the very rapid production of photosensitive opal glasses, and then provides means for developing colors in those glasses.

DESCRIPTION OF PREFERRED EMBODIMENTS

In the work described hereinafter, the glass composition listed below, expressed in terms of parts by weight on the oxide basis, was melted in a small, continuously melting glass tank. Because it is not known with which cation(s) the bromide and fluoride are combined, they are merely reported as bromide and fluoride. Furthermore, inasmuch as the total of the individual components approximates 100, for all practical purposes the recited value of each may be deemed to represent weight percent.

| | | | | | |
|---|---|---|---|---|---|
| $SiO_2$ | 68.70 | $Sb_2O_3$ | 0.154 | Softening Point | 648° C. |
| $Al_2O_3$ | 7.53 | $CeO_2$ | 0.0107 | Annealing Point | 460° C. |
| $Na_2O$ | 15.97 | F | 1.92 | Strain Point | 424° C. |
| ZnO | 4.58 | Br | 1.044 | | |
| Ag | 0.0123 | $SnO_2$ | 0.0397 | | |

A commercial "low iron" sand comprised the source of $SiO_2$ to minimize the addition of such ultraviolet absorbing materials as $Fe_2O_3$ and $TiO_2$. The fluoride was conveniently incorporated as $Na_2SiF_6$ and the bromide as NaBr. $CeO_2$ was sourced as the oxide and Ag as a batch mixture of $Ag_2O$ and sand. $Na_2O$ was included in the form of $Na_2CO_3$ and $NaNO_3$, the latter being useful in controlling the oxidation state of the glass. The other components were incorporated as oxides.

In accordance with conventional glass melting practice, the batch ingredients were compounded, thoroughly mixed together to aid in achieving a homogeneous melt, and then charged into the melting unit. Sheet having a thickness of about 0.235" ($\approx$6 mm) and a width of about 50" ($\approx$127 cm) was produced utilizing the downdrawn sheet forming processes generally described in U.S. Pat. Nos. 3,338,696 and 3,682,609 and annealed. Such processes can provide sheet of optical quality.

Test samples having dimensions of 2"×1" (≈50.8×25.4 mm) were cut from the sheet for use in illustrating methods operable in the present invention and the colored products that can be derived therefrom. Examples I–III record three embodiments of the preferred method.

Example I

Through movement of a photoresist across the upper surface of the above samples, strips approximately 1"×0.25" (≈25.4×6.4 mm) were exposed for various times to the ultraviolet radiation emanating from the Hg-Xe arc lamp having 1000 watts power referred to above. Thereafter, the so-exposed strips were subjected to a temperature of 540° C. for 40 minutes to develop nuclei of colloidal silver therein. The strips were then cooled to room temperature to effect the development of NaF nuclei on the colloidal silver. The strips were subsequently heated to 560° C. and maintained at that temperature for 20 minutes to generate the growth of NaF crystallites on the nuclei. Finally, the strips were re-exposed to the radiation emanating from the Hg-Xe arc lamp for 20 minutes, while at a temperature of 350° C., to cause the deposition of metallic silver upon the surface of at least a portion of the crystallites, and then cooled to room temperature.

Table I reports the times (in seconds) of the initial exposures to ultraviolet radiation and the color the strips as viewed visually.

TABLE I

| Exposure Time | Visual Appearance |
| --- | --- |
| 0 | Light yellow-transparent glass |
| 10 | Light yellow-light opal glass |
| 20 | Light blue-dense opal glass |
| 30 | Blue-dense opal glass |
| 40 | Purple-dense opal glass |
| 50 | Pink-dense opal glass |
| 60 | Peach-dense opal glass |
| 90 | Peach-dense opal glass |

Example II

Strips of the above samples having dimensions of approximately 1"×0.25" (≈25.4×6.4 mm) were exposed for various times to the ultraviolet radiation emanating from the Hg-Xe arc lamp having 1000 watts power referred to above. Thereafter, the so-exposed strips were subjected to various temperatures for a period of 40 minutes and then cooled to room temperature. Subsequently, the strips were heated to 560° C. and held thereat for 20 minutes. Finally, the strips were re-exposed to the Hg-Xe arc lamp for 20 minutes, while at a temperature of 350° C., and cooled to room temperature.

Table II records the times (in seconds) of the initial exposures to ultraviolet radiation, the temperatures (in °C.) of the first heat treatment, and the color of the strips as viewed visually.

TABLE II

| Exposure Time | First Heat Treatment Temperature | | | | |
| --- | --- | --- | --- | --- | --- |
| | 500° C. | 520° C. | 540° C. | 560° C. | 580° C. |
| 10 | White | White | *Hazy | *Hazy | *Clear |
| 20 | Violet | Violet | Light Blue | White | *Hazy |
| 30 | Light Pink | Light | Blue | White | *Hazy |
| 40 | Peach | Peach | Purple | Light Blue | *White |
| 50 | Peach | Peach | Pink | Blue | *White |
| 60 | Peach | Peach | Peach | Purple | *White |
| 90 | Peach | Peach | Peach | Pink | Trace blue |

*Indicates low opalization

Example III

Strips of the above samples having dimensions of approximately 1"×0.25" (≈25.4×6.4 mm) were exposed for various times to the ultraviolet radiation of the above-described Hg-Xe arc lamp. Subsequently, the so-exposed strips were subjected to 540° C. for a period of 40 minutes and then cooled to room temperature. Thereafter, the strips were heated to various temperatures and maintained thereat for 20 minutes. Finally, the strips were re-exposed to the Hg-Xe arc for 20 minutes while at a temperature of 350° C.

Table III reports the times (in seconds) of the exposures to the Hg-Xe lamp, the temperatures (in °C.) of the second heat treatment, and the color of the strips as viewed visually.

TABLE III

| Exp. Time | Second Heat Treatment Temperature | | | |
| --- | --- | --- | --- | --- |
| | 550° C. | 560° C. | 570° C. | 580° C. |
| 10 | *Slight haze | *Very hazy | *Off-White | *Light peach |
| 20 | *Very hazy | Bluish | White | *Light peach |
| 30 | Light blue | Blue | Violet | *Light peach |
| 40 | Blue | Purple | Violet/peach | Peach |
| 50 | Dark blue | Violet | Violet/peach | Peach |
| 60 | Purple | Pink | Pink | Peach |
| 90 | Pink | Peach | Peach | Peach |

*Indicates low opalization

As can be discerned from the above Examples, a broad palette of colors can be produced through control of times of exposure to shortwave radiation and the times/temperatures of heat treatments. The Examples also illustrate the practicality of utilizing temperatures between about 500°-580° C. to effect the growth of opacifying NaF crystallites.

Example IV illustrates the desirability of conducting the final exposure to ultraviolet radiation while the glass is at a temperature between about 300°-450° C.

Example IV

In like manner to Examples I–III, strips approximately 1"×0.25" (≈25.4×6.4 mm) of the test samples were exposed for various time to the ultraviolet radiation of the above-described Hg-Xe lamp. Subsequently, the so-exposed strips were subjected to 540° C., maintained thereat for 40 minutes, and then cooled to room temperature. The strips were thereafter heated to 560° C., held thereat for 20 minutes, and then cooled to room temperature. Thereupon, the strips were exposed for 20 minutes to the Hg-Xe lamp at room temperature, followed by heating (without ultraviolet exposure) to 350° C., holding at that temperature for 20 minutes, and then cooling to room temperature.

Table IV records the times (in seconds) of the initial exposure to ultraviolet radiation and the colors produced after the last exposure/heat treatment step had been repeated twice more.

TABLE IV

| Exposure Time | Visual Appearance |
| --- | --- |
| 0 | Yellow-transparent glass |
| 10 | Yellowish-light opal glass |
| 20 | Off-white-medium opal glass |
| 30 | Light blue-dense opal glass |
| 45 | Purple-dense opal glass |
| 60 | Pink-dense opal glass |
| 90 | Pink-peach-dense opal glass |
| 120 | Peach-dense opal glass |

It required three exposures/heat treatments of the last step of produce colors of the same intensity as those resulting from a single 20 minute simultaneous exposure/heat treatment. Hence, conducting the exposure at room temperature rather than at 300°–450° C. required three times the period therefor. Moreover, the twice repeated sequential exposure/heat treatment produced strong yellowing of the unexposed glass, required longer initial exposures to provide dense opal glasses, and caused a yellow shift in the colors developed in the final product.

Hence, whereas the method of Example 4 can be utilized to prepare colored articles, it is far less practical economically and the colors produced thereby are less pure.

We claim:

1. An opaque glass article wherein at least a portion thereof has an integral colored surface layer of a thickness not exceeding about 1 mm, said surface layer containing NaF crystallites in a concentration of at least about 0.1% by volume and of a size of at least about 0.1 micron in diameter with a deposit of metallic silver on the surface of at least a portion of at least some of the individual crystallites, said surface portion of said crystallites having said deposit of metallic silver being less than about 200 Å in the smallest dimension, said glass being essentially free from materials strongly absorbing of ultraviolet radiations, being in a reduced state, and consisting essentially, expressed in terms of weight percent in the oxide basis, of about 14–18% $Na_2O$, 0–6% ZnO, 6–12% $Al_2O_3$, 0–5% $B_2O_3$, 0–0.2% $Sb_2O_3$, 0–0.1% SnO, 65–72% $SiO_2$, and 0.007–0.04% Ag, 0.008–0.05% $CeO_2$, 0.7–1.25% Br, and 1.5–2.5% F as analyzed in the glass, the sum of those components constituting at least 90% of the total composition.

2. An opaque glass article according to claim 1 wherein said glass also contains at least one of the following ingredients in the indicated proportions selected from the group of up to 2% $Li_2O$, up to 5% $K_2O$, up to 3% BeO and/or MgO and/or CaO, up to 5% BaO and/or CdO and/or SrO, up to 0.1% Cl and up to 0.2% I.

* * * * *